(12) United States Patent
Boudreau

(10) Patent No.: US 6,854,593 B2
(45) Date of Patent: Feb. 15, 2005

(54) PAD-TYPE IDLER FOR CONVEYOR BELTS

(75) Inventor: Jean-Marc Boudreau, c/o Canglide Inc., P.O. 545, Bathurst, New Brunswick (CA), E2A 3Z4

(73) Assignee: Jean-Marc Boudreau, New Brunswick (CA)

( * ) Notice: Subject to any disclaimer, the term of this patent is extended or adjusted under 35 U.S.C. 154(b) by 0 days.

(21) Appl. No.: 10/706,910

(22) Filed: Nov. 14, 2003

(65) Prior Publication Data

US 2004/0094392 A1 May 20, 2004

(30) Foreign Application Priority Data

Nov. 15, 2002 (CA) .............................................. 2411869

(51) Int. Cl.⁷ ............................................ B65G 15/60
(52) U.S. Cl. ..................................... 198/841; 198/502.1
(58) Field of Search ................................ 198/841, 837, 198/823, 821, 817, 502.1

(56) References Cited

U.S. PATENT DOCUMENTS

| 4,951,809 | A | * | 8/1990 | Boothe et al. | ............... 198/841 |
| 5,031,757 | A | * | 7/1991 | Draebel et al. | ............. 198/852 |
| 5,601,180 | A | * | 2/1997 | Steeber et al. | ............. 198/841 |
| 5,799,780 | A | * | 9/1998 | Steeb et al. | ................. 198/823 |
| 5,988,360 | A | * | 11/1999 | Mott | ........................... 198/823 |
| 6,237,753 | B1 | * | 5/2001 | Walter et al. | ................ 198/824 |

* cited by examiner

*Primary Examiner*—James R. Bidwell
(74) *Attorney, Agent, or Firm*—Stikeman Elliott LLP; Eugene F. Derenyi

(57) ABSTRACT

An idler for a conveyor belt, in which the idler has a pad including a bottom surface and a top surface; a bore in the bottom surface, the bore including a frusto-conical portion extending from the bottom surface toward the top surface, whereby as the pad wears, the bore is exposed in the top surface.

17 Claims, 3 Drawing Sheets

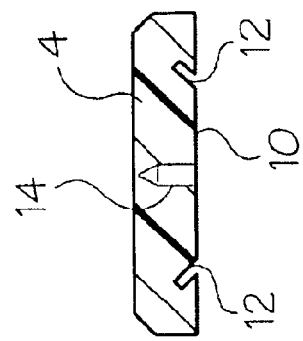
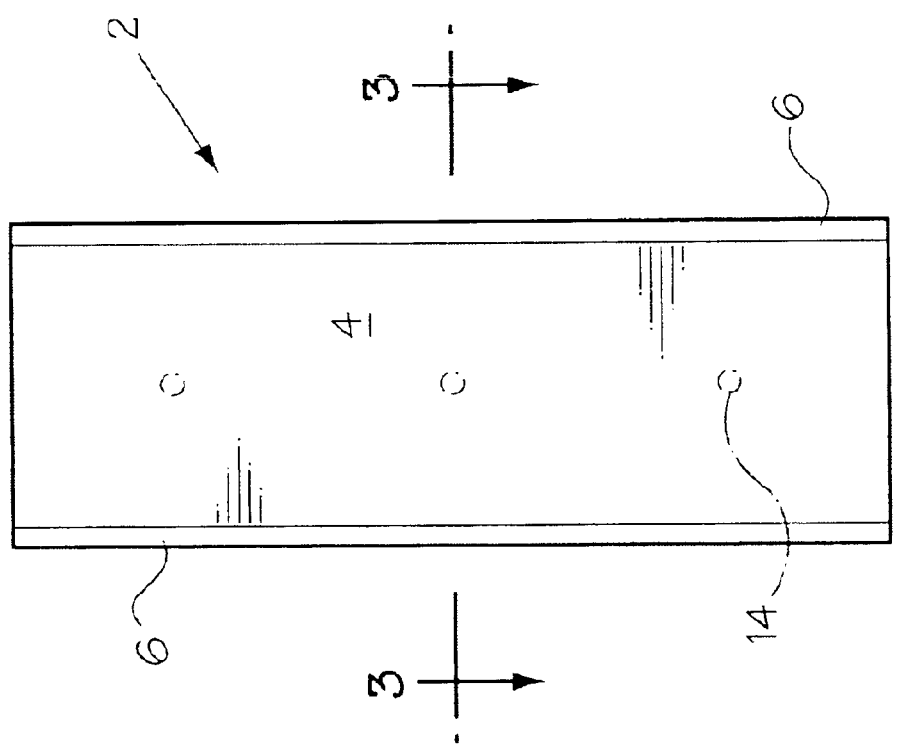

PAD-TYPE IDLER FOR CONVEYOR BELTS

CROSS REFERENCE TO RELATED APPLICATIONS

This application claims priority from Canadian Patent application serial no. 2,411,869, filed Nov. 15, 2002.

FIELD OF THE INVENTION

The present invention relates to idlers used to support conveyor belts and, in particular, wear indicators for pad-type idlers.

BACKGROUND OF THE INVENTION

Pad-type idlers are used to support conveyor belts. For example, U.S. Pat. No. 5,799,780 issued to Raymond on Sep. 1, 1998, discloses a pad-type idler, referred to therein as a wear bar, on which a conveyor belt slides over an upper surface of the wear bar. In the first embodiment of Raymond, a feed idler assembly is disclosed which includes a generally U-shaped frame having a base, a pair of legs positioned on opposite ends of the base and a pair of shorter intermediate supports positioned between the legs. A plurality of plates is attached between the ends of the legs opposite the base and between the ends of the intermediate supports. Wear bars are attached to the plates on the side thereof opposite the base of the U-shaped frame. A conveyor belt slides over the wear bars.

With use, the upper surfaces of the wear bars become worn by the friction of the conveyor running over top of them. Care must be taken to replace the wear bars before they become worn down to the plates and the conveyor belt is damaged as a result. The challenge, however, is to gage the amount of wear on the wear bars. There is no wear indicator disclosed in Raymond for indicating that it is time to replace the wear bar.

Canadian patent application number 2,327,646, filed Dec. 6, 2000, discloses a pad-type idler for conveyor belts wherein the pads include bores. The bores extend from the bottom surface of the pad through the pad in an axis perpendicular to the bottom surface. The bores, however, do not extend the entire width of the pad to the top surface of the pad such that, the bores in an unworn pad are not visible from the top surface. As the top surface of the pad is worn by the action of a belt sliding over it down to the bores, the bores are exposed and appear as circular openings in the top surface of the pad. The appearance of the circular openings indicate the need to replace the pad.

While the wear indicator of the '646 application is useful for indicating when a pad has been worn to the point of needing replacement, it does not provide any progressive indication of wear to indicate the degree of pad wear at any given time. Therefore, it would be desirable to have a pad wear indicator which overcomes the above disadvantages in the prior art.

SUMMARY OF THE INVENTION

Accordingly, the invention relates to a pad-type idler for a conveyor belt, the idler comprising a pad including a first surface and, a second surface for contacting the conveyor; a wear indicator extending from the first surface to a point adjacent the second surface, whereby, wearing of the top surface of the pad exposes the wear indicator in the second surface.

In another embodiment, the invention relates to a non-moving idler for a conveyor comprising a pad including a surface for contacting the conveyor; a wear indicator in the pad adjacent the surface whereby wearing of the surface exposes the wear indicator.

BRIEF DESCRIPTION OF THE DRAWINGS

The invention is described below in greater detail with reference to the accompanying drawings, which illustrate a preferred embodiment of the invention, and wherein:

FIG. 2 is a top view of a pad with wear indicators according to the invention;

FIG. 3 is a section taken along line 3—3 of FIG. 2;

DETAILED DESCRIPTION OF THE PREFERRED EMBODIMENT

Figure 1:
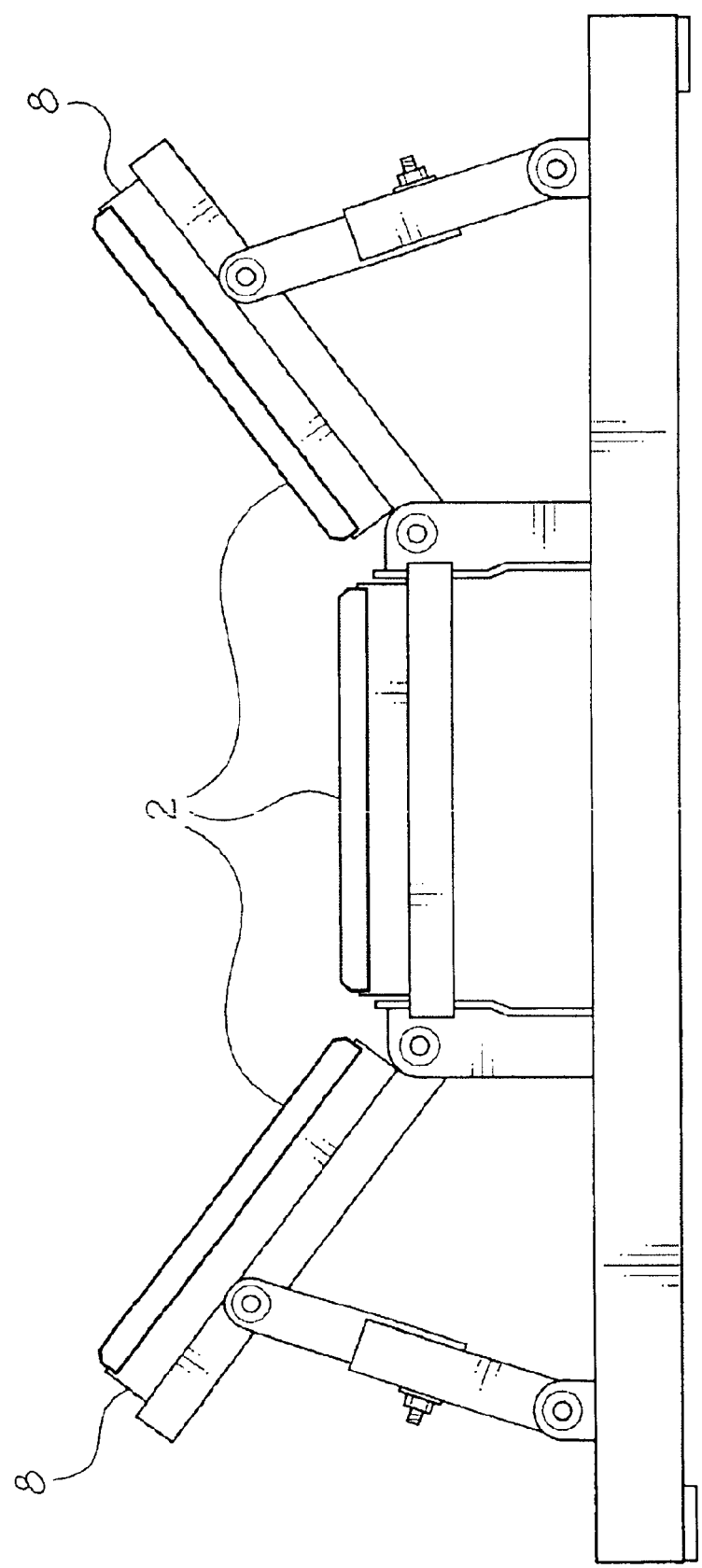
FIG. 1 is a view of an idler assembly fitted with pads according to the invention.
Figure 5:
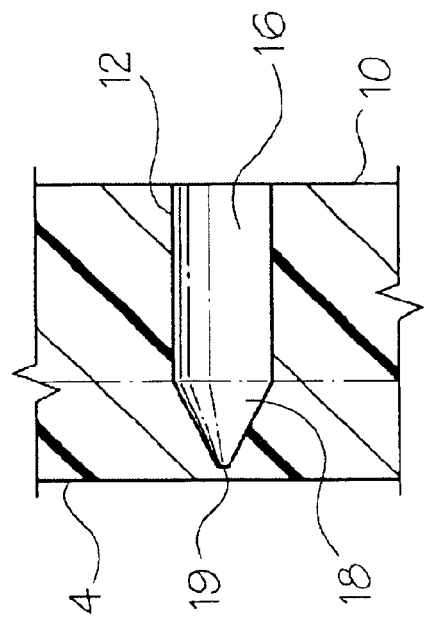
FIG. 5 is an enlarged view of one of the bores in the pad of FIG. 4.
Figure 4:
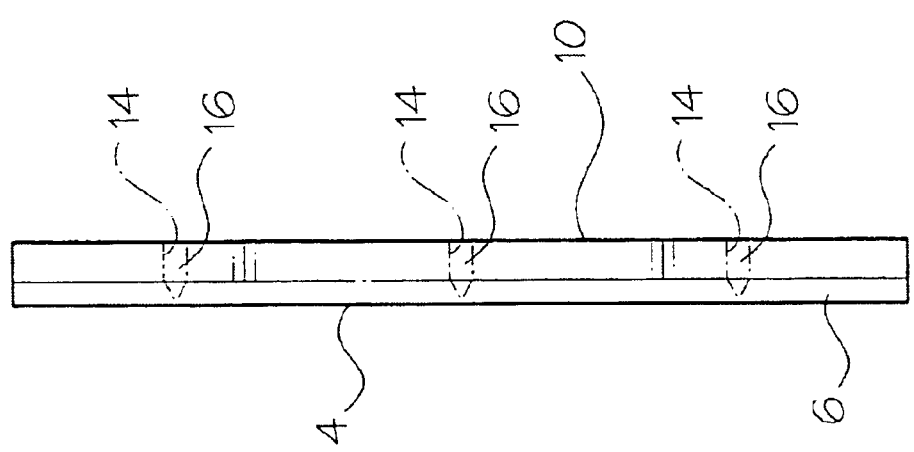
FIG. 4 is a side view of the pad of FIG. 2.

The pad-type idler, according to the present invention, comprises a rectangular pad indicated generally at 2 made of PTFE material available from Enflow Canada. PTFE is a mixture of a Teflon™-type material and carbon graphite. The pad 2 has a top surface 4 and bevelled edge surfaces 6. The pad 2 is supported on a metal support angle 8. The bottom 10 of the pad 2 has a pair of angled longitudinal grooves 12 that are used to mount the pad 2 to the metal support angle 8. Each leg (not shown) of the metal support angle 8 makes an angle of 45 degrees with the bottom plane 10 of the pad 2. The pad 2 further has a plurality of bores 14 through the bottom 10. Referring to FIGS. 3, 4 and 5, each bore 14 includes a cylindrical segment 16 which extends from the bottom 10 of the pad 2 into the pad 2, and a frusto-conical segment 18 at the end of the cylindrical segment 16 removed from the bottom 10. The top 19 of the frusto-cone 18 is preferably spaced $\frac{1}{32}$ inch below the top surface 4 but can be spaced $\frac{1}{4}$ inch or other suitable dimension below the surface 4. Alternatively, the pad 2 can be manufactured with the top 19 of the frusto-cone 18 exposed in the top surface 4 of the pad 2. Preferably, however, the bores 18 do not extend all the way to the top surface 4 of the pad 2, which contacts a belt conveyor (not shown), such that upon wear of the pad 2 in use, the bores 18 are eventually exposed in the top surface 4 of the pad 2, beginning with the top 19. As the top surface 4 of the pad 2 wears, a progressively larger diameter of the frusto-cone 18 is exposed as the top surface 4 of the pad 2 wears through the frusto-cone 18 until the cylindrical segment 18 of the circular bore 18 is exposed. Once the cylindrical segment 18 is exposed in the top surface 4, it is time to replace the pad 2 to prevent wearing of the pad 2 through the angled longitudinal grooves 12. The increase in diameter of the exposed bore 16 with wear provides an operator with a convenient visual reference by which to gage the amount of wear on the pad 2. A larger exposed bore 18 indicates more wear than a smaller exposed bore 18. The size of the exposed "circle" can easily be correlated with the depth of wear of the pad.

In another embodiment of the invention, the cone can be used in place of a frusto-cone.

In further embodiments of the invention, the entire bore 18 can be a cone, frusto-cone or wedge shaped.

I claim:

1. A pad-type idler for a conveyor belt, the idler comprising:
   a pad including a first surface and, a second surface for contacting the conveyor;
   a wear indicator extending from the first surface part way through the pad to a point adjacent the second surface, whereby, wearing of the second surface of the pad exposes the wear indicator in the second surface.

2. An idler according to claim 1, wherein the wear indicator includes a frusto-conical section adjacent the second surface.

3. An idler according to claim 1, wherein the wear indicator includes a conical section adjacent the second surface.

4. An idler according to claim 1, wherein the wear indicator extends to the second surface.

5. An idler according to claim 1, wherein the wear indicator is frusto-conical.

6. An idler according to claim 1, wherein the wear indicator is conical.

7. An idler pad according to claim 1, including a plurality of wear indicators.

8. An idler pad according to claim 1, wherein the wear indicator is a bore.

9. A non-moving idler for a conveyor comprising:
   a pad including a surface for contacting the conveyor;
   a wear indicator extending into the pad adjacent the surface whereby wearing of the surface exposes the wear indicator.

10. An idler according to claim 9, wherein the wear indicator is narrowest nearest the surface and is wider away from the surface, whereby progressive wearing of the surface exposes progressively larger sections of the wear indicator.

11. An idler according to claim 9, wherein the wear indicator is a depression.

12. An idler according to claim 9, wherein the wear indicator is a circle in cross-section.

13. An idler according to claim 9 wherein the wear indicator includes a frusto-conical section adjacent the second surface.

14. An idler according to claim 9, wherein the wear indicator includes a conical section adjacent the second surface.

15. An idler according to claim 9, wherein the wear indicator is frusto-conical.

16. An idler according to claim 9, wherein the wear indicator is conical.

17. An idler pad according to claim 9, wherein the wear indicator is a bore.

* * * * *